C. H. HAPGOOD.
SPRING SCALE.
APPLICATION FILED OCT. 7, 1918.

1,424,354.

Patented Aug. 1, 1922.

Witness
C. E. Wilcox.
Frances Doyle

Inventor
Clarence H. Hapgood.
By George R. Frye
Attorney

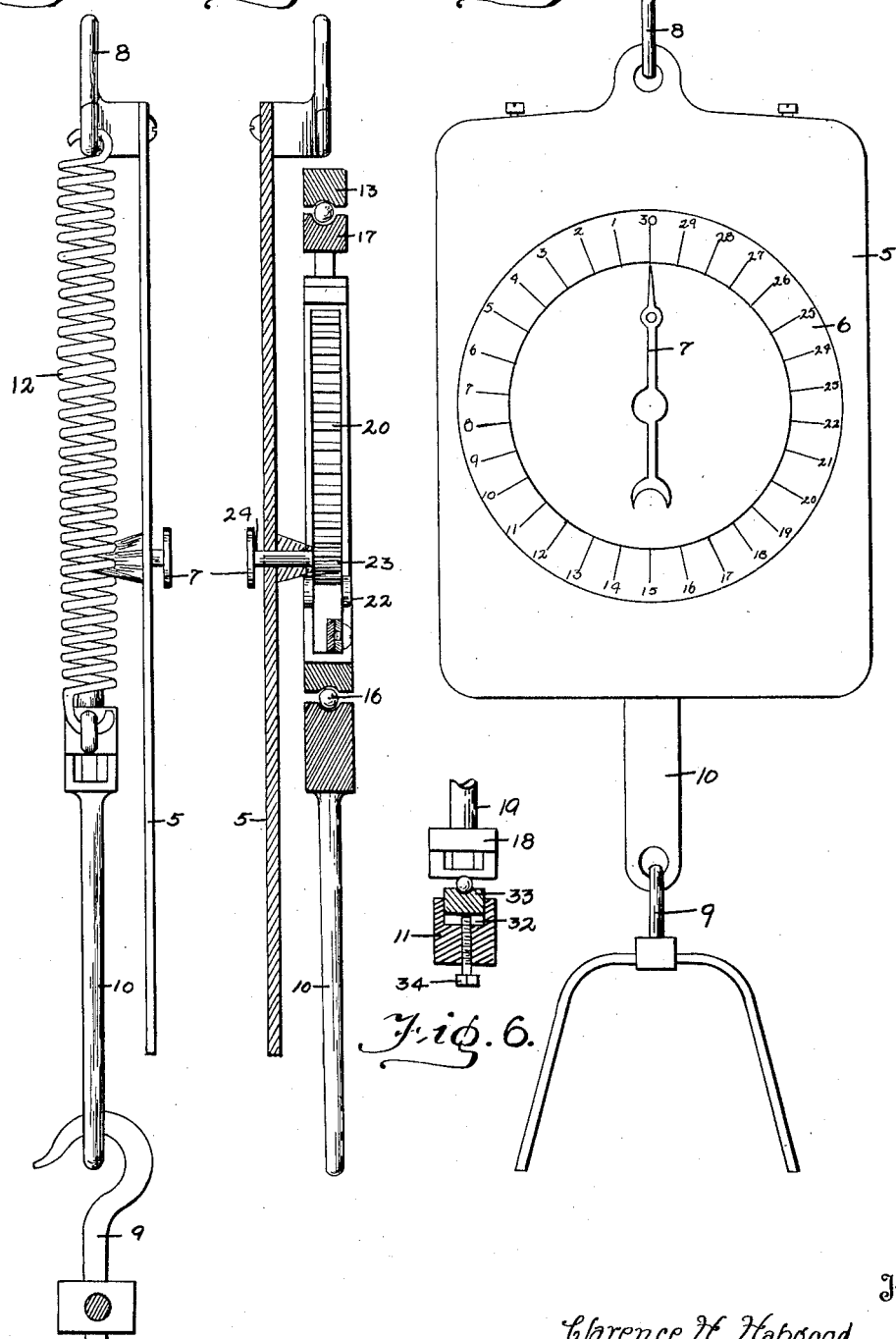

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SPRING SCALE.

1,424,354. Specification of Letters Patent. Patented Aug. 1, 1922.

Application filed October 7, 1918. Serial No. 257,087.

*To all whom it may concern:*

Be it known that I, CLARENCE H. HAPGOOD, a citizen of the United States, residing at Toledo, in the county of Lucas and State of Ohio, have invented certain new and useful Improvements in Spring Scales, of which the following is a specification.

This invention relates to improvements in weighing scales, and more particularly that type of scales in which the elongation and contraction of a spring or springs is relied upon to counteract the weight of a commodity placed upon the scale platform. It is well known that the tension of a coil spring varies with the rise and fall of the surrounding atmospheric temperature. For example, the tension of such spring weakens with a rise in the temperature from the normal degree of temperature at which the scale is adjusted, and the change and consequent weakening of the tension of the weighing springs is caused by the elongation and expansion of the wire in said spring and by the fibers of the metal becoming more or less elastic. As a consequence of these changes the weighing accuracy of a spring scale is constantly impaired and rendered unreliable, and the use of spring scales is objectionable on this account. To obviate this serious defect in this class of scales is the principal object of this invention.

Other objects and advantages will readily appear from the following description, in which reference is had to the accompanying drawings illustrating a preferred embodiment of my invention, and in which similar reference characters designate similar parts throughout the several views.

In the drawings:—

Fig. 3 is a front view of the scale.

Fig. 4 is a side elevation thereof.

Figure 5 is a vertical section taken substantially through the center of the scale shown in Figure 1.

Fig. 6 is an enlarged detail section taken substantially on the line 6—6 of Fig. 1.

Figure 1:
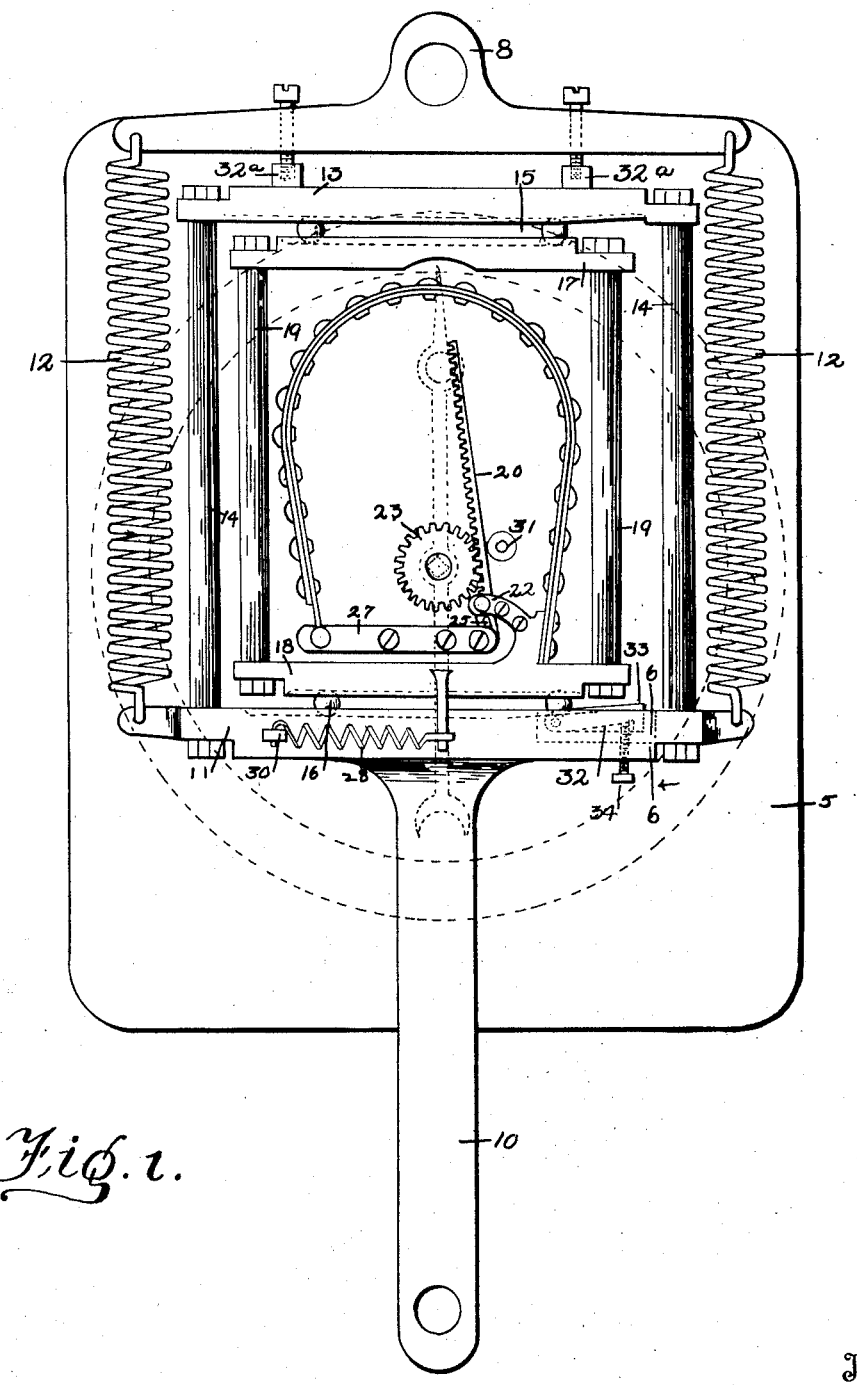
Fig. 1 is a rear view of a scale embodying my invention with the parts shown at zero position of the scale and at a normal degree of temperature of say 65° Fahrenheit.

Referring to the drawings, 5 designates the frame-work of the scale carrying upon its forward face the dial 6 marked with the usual pound and ounce graduations adapted to co-operate with the pointer 7 pivoted concentrically of the dial in indicating the weights of commodities weighed on the scale. In the illustrated embodiment of the invention a scale of the hanging type is shown, and the frame 5 is adapted to be suspended from any desired position by means of the ring or hook 8. A scale pan (not shown) is suitably suspended by means of the hook 9 from the lower extremity of the draw-bar 10 which is rigidly connected with the lower crossbar or track 11 of an outer frame to which the lower ends of the weighing springs 12 are secured. The upper extremities of the springs 12 are firmly secured to opposite ends of an anchor bar secured to the framework of the scale.

The outer frame above mentioned preferably comprises an upper crossbar or track 13 which is secured to the lower crossbar or track 11 by means of suitable tie rods 14. The bars or tracks 11 and 13 are respectively provided with longitudinal grooves 15 for the guidance of anti-friction elements 16 interposed between said bars and the upper and lower bars of an inner relatively movable frame provided with co-operating grooves for similarly receiving the anti-friction elements. This inner frame comprises an upper crossbar 17 which is connected with the lower crossbar 18 by suitable tie rods 19, the lower cross bar 18 being suitably shaped and provided with associated elements to carry the rack 20 and the thermostatic controlling device 21 arranged to alter the position of the rack in accordance with changes in temperature. The rack 20 is pivoted substantially as shown adjacent its lower extremity between brackets 22 extending upwardly from the crossbar 18, and meshes with a pinion 23 fixed on the shaft 24 carrying the index or pointer 7. It is essential that the fulcrum of said rack be in a direct line coinciding with the pitch line of the teeth of said rack. That portion of the rack 20 extending below the bracket 22 is provided with an elongated slot 25 in which is suitably secured a wrist pin 26 carried adjacent one extremity of an adjustable link 27, the other extremity of which is pivotally secured to the free extremity of the thermostatic controlling device 21, the other end of which device is rigidly secured to the lower bar 18 of the inner frame. The adjustable link 27 is preferably composed of two members slotted substantially as shown and provided with securing elements which may be loosened to allow adjustment of the members relatively to each other and again tightened to hold said members in their adjusted positions. A light spring 28 is secured between a downwardly-extending projection 29 on the lower bar 18 of the inner frame and a lug 30 carried by the lower bar of the outer frame, said spring being instrumental in holding the teeth of the rack firmly in mesh with the teeth of the pinion.

The thermostatic controlling device, herein shown is constructed of two metals with different expanding and contracting coefficients—for example, brass and steel, rigidly united with the former metal on the inner side. The shape of the thermostat is preferably of a horse-shoe form in order to obtain a greater extent of movement therefrom and in order to clear the rack and encircle the pinion in whatever position the scale mechanism may be. I do not intend to limit myself to any particular form of thermostat and disclose the thermostat shown merely as one method that has been found to work satisfactorily in the scale.

Figure 2:
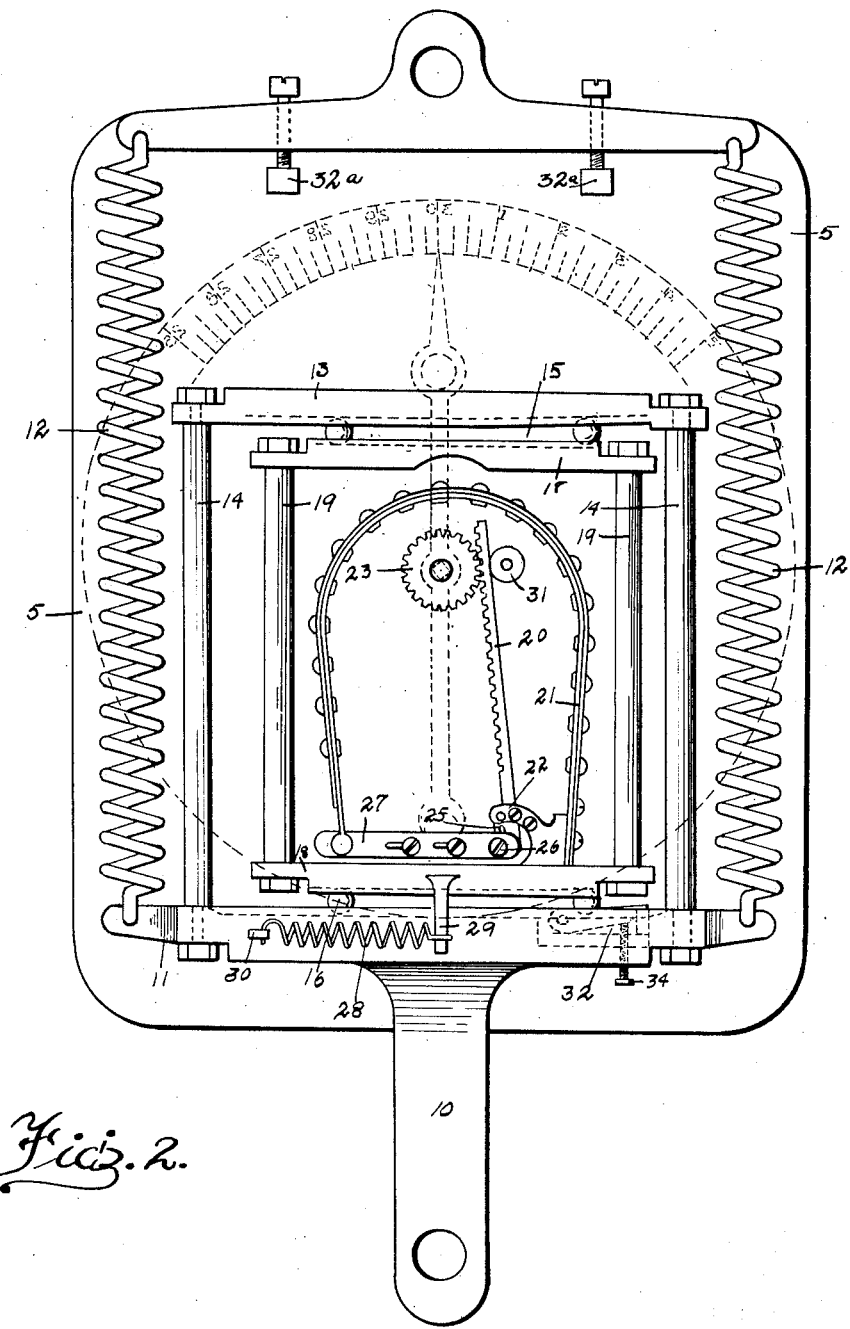
Fig. 2 is a view similar to Fig. 1 showing the scale with the springs extended to full capacity of the scale.

In the operation of the scale, when a commodity is placed in the scale pan the drawbar 10 is moved downwardly carrying with it the outer frame and extending the weighing springs 12 to a position offsetting the weight of the commodity, the inner frame being moved downwardly with the outer frame and relatively to the pinion 23, which is mounted on the framework of the scale. The downward motion of the inner frame moves the rack 20 downwardly rotating the pinion 23 and the pointer 7, and since the connection of the rack with the lower frame is in line with the pitch line of the rack, the continued travel of said rack downwardly will force the inner frame to move transversely on the outer frame, the anti-friction elements 16 relieving the friction and permitting easy travel of the inner frame from the initial position at the right of the outer frame shown in Fig. 1 toward the position at the left of the outer frame shown in Fig. 2. During the travel of the inner frame transversely on the outer frame the light spring 28 is extended, and the tension of this spring holds the rack firmly in mesh with the pinion 23, the rack being also guided in its motion by the roller 31 fixed on the framework of the scale. When the commodity has been removed from the scale pan the springs 12 return to their original positions, thereby again bringing the inner and outer frames and associated mechanism to their initial positions. Adjustable bumpers 32ª are preferably provided to limit the upper movement of the outer frame.

As before mentioned, the position of the rack 20 illustrated in the drawings is that which is assumed at a normal degree of temperature, say at 65° F. A rise in the temperature of the surrounding atmosphere will tend to straighten the horse-shoe shaped thermostat 21, and through the connection of the thermostat with the rack 20 will serve to deflect the rack toward a perpendicular position, the perpendicular position of the rack being the upper extreme to which the scale may be adjusted for accurate weighings. Assuming that the scale is adjusted for a maximum temperature of 100° F., the rack would assume a perpendicular position when this temperature is reached, and when weighing at this temperature the rack would travel vertically with the inner frame without causing any transverse movement of the inner frame relatively to the outer frame of the scale. As the temperature of the surrounding atmosphere decreases, however, this temperature change acting upon the thermostat will tend to contract the thermostat 21 and decrease the distance between the pivot end of the thermostat and the fulcrum of the rack, thereby inclining the rack 20 toward the position shown in the drawings, which as above stated is approximately the position that the rack would assume at a normal temperature of, say 65° F. It will be understood, however, that this is an intermediate position and that a continued fall in the temperature would serve to increase the inclination of the rack 20 from the perpendicular, this inclination being continued until the maximum inclination of the rack is reached at the minimum extreme of temperature to which the scale is adjusted. When weighing in this minimum extreme, say zero temperature, the inclination of the rack will cause a maximum movement of the inner frame transversely on the outer frame as the rack and frames are moved downwardly during the extension of the weighing springs.

When the rack is in a perpendicular position, i. e., when working at the maximum temperature to which the scale is adjusted, the weighing springs 12 will be correspondingly weakened so that the extension of the springs during the weighing operation will be greatest at this maximum temperature.

The rack in its perpendicular position will, however, rotate the pinion exactly in proportion with the amount of travel of the outer frame to which the lower ends of the weighing springs are secured. As the temperature of the surrounding atmosphere decreases, the weighing springs are contracted and stiffened correspondingly with the inclination of the rack, so that while the travel of the outer frame and the expansion of the weighing springs will be less for the same weight than at the higher temperature, the inclined position of the rack will cause a greater amount of movement of the rack over the pinion so that the pointer 7 would indicate the same weight as before despite the lesser travel of the outer frame. The contraction of the weighing springs 12 and the inclination of the rack 20 are simultaneously and correspondingly increased as the temperature falls, the greater travel of the rack relatively to the pinion compensating for the lesser travel of the outer frame and the lesser extension of the springs as the temperature decreases. It will be further understood that the rack will be maintained at any inclination between its two extreme positions at any point of the indicating mechanism from the zero position to the full capacity of the scale as long as the atmospheric temperature which was instrumental in moving the rack to such position remains constant at any given temperature and that equal increments of load will therefore result in equal movements of the hand throughout the capacity of the scale.

The position of the wrist pin 26 in the slot 25 may be changed at will in order to obtain a greater or less extent of movement of the rack from the thermostat—for example, in adjusting the scale in the factory. If the motion which the thermostat will impart to the rack during a fall of the atmosphere to a zero degree temperature is not sufficient to correct the error which that range of temperature will cause in the indicating mechanism through its effect on the springs, the wrist pin 26 may be moved nearer to the fulcrum of the rack, and thus there will be imparted to said rack a greater movement away from the perpendicular position.

Because of the shifting of the weight of the inner frame from one side of the center line of the scale to the other during its transverse movement on the outer frame, it has been found desirable to provide means for tilting the inner frame during its travel to compensate for the shifting of weight. In the embodiment herein shown the lower bar or track 11 is provided with a recess or groove 32 extending from the upper surface thereof, in which recess is pivoted an adjustable compensating member 33 which is adapted to be moved into variable inclined positions by means of an adjusting screw 34 threaded into the lower bar 11. This adjustable compensating member 33 is shown as slightly elevated above the upper surface of the bar 11, and in a position to elevate the inner frame during its transverse movement, by causing the adjacent bearing 16 to ride up the incline of said member, thereby tilting the inner frame to compensate for the lateral shifting.

It will be understood that my invention is not limited to scales of the type shown, but is equally useful in scales of other kinds, such as counter scales, portable and dormant scales, etc.

While the embodiment herein illustrated discloses a construction well adapted to adequately fulfill the objects of the invention primarily stated, it will be understood that my invention is susceptible to modification, variation and change within the spirit and scope of the subjoined claims.

Having described my invention, I claim:

1. In a weighing scale, in combination, load-counter-balancing mechanism, including springs, an indicator, motion-transmitting means to cause movement of the indicator proportional to the distortion of the springs under load, a thermostatic device for changing the ratio of movement of said indicator as compared with the distortion of the springs to compensate for the effect of changes of temperature on said springs, and means so connecting said thermostatic device to said motion-transmitting means as to maintain the ratio of movement of said indicator as compared with the distortion of the springs substantially constant throughout the capacity of the scale.

2. In a weighing scale, in combination, load-counter-balancing mechanism, including springs, an indicator, and motion-transmitting means to cause movement of said indicator proportional to the distortion of said springs under load, said motion-transmitting means including a rack, a pinion meshing therewith, a thermostatic device for varying the angle of the pitch line of said rack to its direction of movement, and means to maintain said angle substantially constant throughout the capacity of the scale.

3. In a motion-transmitting device, in combination, a rectilinearly-movable member, a rack movable therewith, a pinion meshing with said rack, means for changing the angle of the pitch line of the rack to the direction of movement of said member, and means for keeping said rack and pinion in mesh without changing such angle during the rectilinear movements of said member.

4. In a scale, load-counterbalancing mechanism including weighing springs, and means for indicating the weight of the load including a pinion, a rack meshing therewith, and a thermostatic controlling device connected with the rack and adapted to vary the angle of inclination of the rack in accordance with changes in temperature, the connection between the rack and controlling device being adjustable to vary the effect of a given change in temperature upon the angle of inclination of said rack.

5. In a scale, load-counterbalancing mechanism including weighing springs, and means for indicating the weight of the load including a pinion, a pivotally mounted rack meshing therewith, the fulcrum of said rack being on a line coinciding with the pitch line of the teeth of said rack, and a controlling device for automatically varying the angle of inclination of said rack in accordance with changes in temperature.

6. In a scale, load-counterbalancing mechanism including weighing springs, and means for indicating the weight of the load including a pinion, a pivotally mounted rack meshing therewith, the fulcrum of said rack being on a line coinciding with the pitch line of the teeth of said rack, a controlling device for automatically varying the angle of inclination of said rack in accordance with changes in temperature, and a movable frame upon which said rack and controlling device are supported.

7. In a scale, load-counterbalancing mechanism comprising weighing springs, and means for indicating the weight of the load including a pinion, a pivotally mounted rack meshing therewith, a thermostat connected with said rack, said connection being below the fulcrum of the rack, and a frame upon which said rack and thermostat are supported.

8. In a scale, load-counterbalancing mechanism comprising weighing springs, and means for indicating the weight of the load including a pinion, a rack meshing therewith and arranged to be in a position substantially parallel with the weighing springs at the highest temperature for which the scale is adjusted, a controlling device connected with the rack for shifting the rack out of said parallel position as the temperature decreases, and a frame upon which the rack and controlling device are supported.

9. In a scale, load-counterbalancing mechanism including weighing springs, an outer frame connected thereto, and means for indicating the load including a rack and pinion, a thermostatic controlling device connected with the rack and adapted to control its inclination, and an inner frame movable on said outer frame and carrying the rack and controlling device.

10. In a scale, load-counterbalancing mechanism including weighing springs, an outer frame connected thereto, and means for indicating the load including a rack and pinion, a thermostatic controlling device connected with the rack and adapted to control its inclination, and an inner frame laterally movable on said outer frame and carrying the rack and controlling device.

11. In a scale, load-counterbalancing mechanism including weighing springs, a crossbar connected thereto, a laterally movable frame supported on the crossbar, a pinion, a rack fulcrumed on said laterally movable frame, and a thermostatic device arranged to automatically vary the angle of inclination of said rack.

12. In a scale, load-counterbalancing mechanism including weighing springs, a crossbar connected thereto, a laterally movable frame supported on the crossbar, a pinion, a rack fulcrumed on said laterally movable frame, a thermostatic device arranged to automatically vary the angle of inclination of said rack, and adjustable connections between the thermostatic device and the rack.

13. In a scale, load-counterbalancing mechanism including weighing springs, an outer frame connected thereto, and means for indicating the load including a rack and pinion, a thermostatic controlling device connected with the rack and adapted to control its inclination, an inner frame laterally movable on said outer frame and carrying the rack and controlling device, and connections between the thermostatic device and said rack below the fulcrum of the rack.

14. In a scale, load-counterbalancing mechanism including weighing springs, an outer frame connected thereto, a rack and pinion, a thermostatic controlling device connected with the rack, an inner frame movable on said outer frame and carrying the rack and controlling device, and an adjustable compensating track below said inner frame.

15. In a scale, load-counterbalancing mechanism including weighing springs, a crossbar connected thereto and carrying an adjustable compensating track member, an inner frame supported upon said crossbar, a rack and pinion, the former being fulcrumed on said inner frame, and a thermostatic device connected with said rack whereby the angle of inclination of the rack is varied in accordance with changes in temperature.

16. In a scale, load-counterbalancing mechanism including weighing springs, a crossbar connected thereto, an inner frame supported upon said crossbar, a resilient connection between said frame and crossbar, a rack and pinion, the former being fulcrumed on said inner frame, and a thermostatic device connected with said rack whereby the angle of inclination of the rack is varied in accordance with changes in temperature.

17. In a scale, load-counterbalancing mechanism including weighing springs, and means for indicating the load including a pinion, a longitudinally movable rack meshing therewith, a thermostat, and adjustable connections between said thermostat and said rack to vary the angle of inclination of the rack.

18. In a scale, load-counterbalancing mechanism including weighing springs, and means for indicating the load including a pinion, a longitudinally movable rack meshing therewith, a thermostat enclosing the rack and pinion, and adjustable connections between said thermostat and said rack to vary the angle of inclination of the rack.

CLARENCE H. HAPGOOD.

Witnesses:
GEORGE R. FRYE,
C. E. WILCOX.